J. J. BOUDREAU.
FISH GAFF OR SPEAR.
APPLICATION FILED JULY 21, 1914. RENEWED OCT. 30, 1916.
1,227,035.
Patented May 22, 1917.
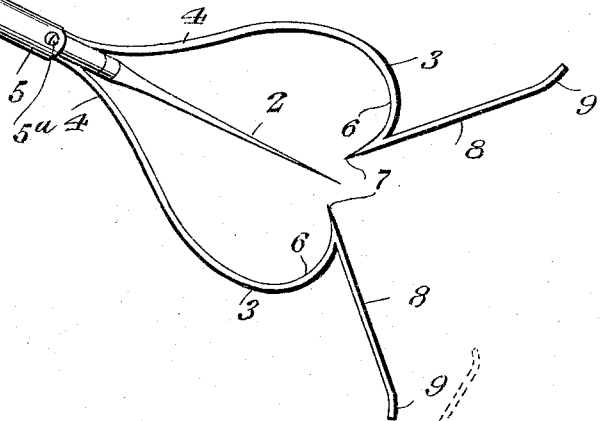
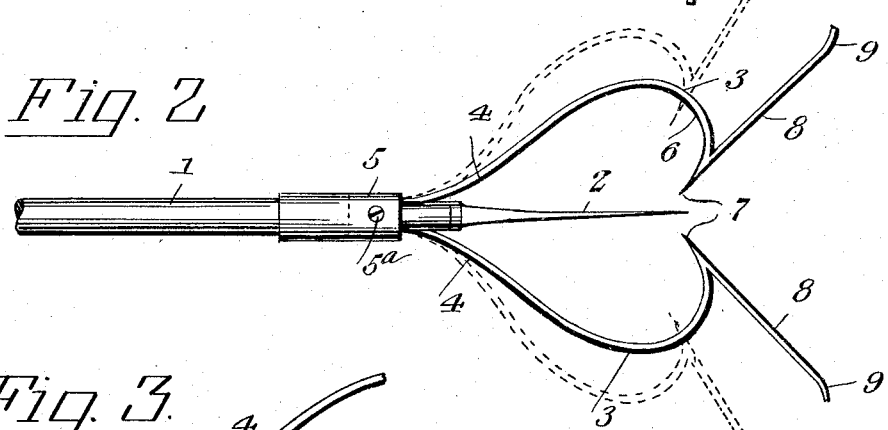
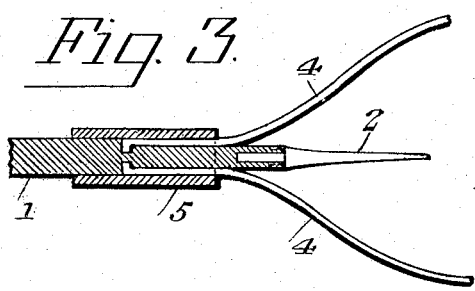
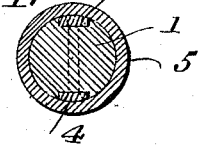
Inventor
J. J. Boudreau
Witnesses
F. H. Shallenberger.
C. C. Hines.
By Victor J. Evans
Attorney

UNITED STATES PATENT OFFICE.

JEREMIAH J. BOUDREAU, OF TOMAHAWK, WISCONSIN.

FISH GAFF OR SPEAR.

1,227,035.    Specification of Letters Patent.    Patented May 22, 1917.

Application filed July 21, 1914, Serial No. 852,211. Renewed October 30, 1916. Serial No. 128,635.

*To all whom it may concern:*

Be it known that I, JEREMIAH J. BOUDREAU, a citizen of the United States, residing at Tomahawk, in the county of Lincoln and State of Wisconsin, have invented new and useful Improvements in Fish Gaffs or Spears, of which the following is a specification.

This invention relates to a gaff for use in landing and spearing fish, the primary object of the invention being to provide a device of this character which is simple, inexpensive and efficient of construction, and by means of which the fish may be gaffed or speared without any material mutilation.

A further object of the invention is to provide a novel construction of spear and gaff or retaining hooks and guides, by which the engagement of the spear with the body of the fish is facilitated, and the fish held speared against any possibility of loss, without material injury to the body of the fish.

The invention consists of the features of construction, combination and arrangement of parts herein fully described and claimed, reference being had to the accompanying drawing in which:—

Figure 1 is a perspective view of a fish spear gaff embodying my invention.

Fig. 2 is a plan view illustrating in full and dotted lines adjustments of the retaining hooks.

Fig. 3 is a longitudinal section through the outer end of the handle, and associated parts.

Fig. 4 is a vertical transverse section thereof.

The device comprises a handle 1, made of wood, metal or other suitable material, to the forward end is attached a spear 2 extending in the plane of the handle. The spear may be secured to the handle in any suitable manner, as by providing it with a shank fitting a socket in the outer end of the handle, as shown.

Disposed on opposite sides of the handle and spear are gaff or retaining hooks 3. These hooks have inner end or shank portions 4 which are suitably secured to the forward end of the handle, and in advance of their point of connection with the handle are flared or diverge therefrom. A fastening and adjusting collar, sleeve or ferrule 5 is mounted upon the handle and fastens the shanks of the gaff hooks thereto, said collar being secured against displacement by a screw or other suitable fastening device 5ᵃ.

As shown, the hooks 3, which are made of spring metal, extend outwardly and forwardly on curved lines, and have inturned ends 6 terminating in pointed barbs 7, which are disposed opposite each other and adjacent to and on opposite sides of the point of the spear 2. The hooks have sufficient spring action for spreading motion to separate the barbs for engagement with fish of widely different sizes.

Connected at their inner ends with the barbs 7 of the gaff hooks are guide or spreader arms 8. These arms project outwardly and forwardly from the barbs in divergent relation, and form a flaring passage or entrance leading to the space between the barbs and the point of the spear 2, the free ends of said arms being bent laterally, at an angle, as shown at 9, to prevent guard surfaces designed to prevent injury to the arms when striking a stone, log or other hard obstacle.

The device may be used either for landing or spearing, and it will be understood that in use it is thrown forward to bring the arms 8 into engagement with the body of the fish, said arm sliding over opposite sides of said body, so as to bring the body of the fish between the hooks, and in position to be pierced by the spear 2. In such action the hooks are spread apart to admit the body of the fish and allow the spear to enter the same, and to move inward by their spring action so that the barbs 7 will engage and hold the body of the fish enspeared.

It will thus be seen that the arms 8 act as guiding surfaces by which the spear and hooks are brought into engagement with the body of the fish, and that the spear serves to pierce the body of the fish and hold it from lateral displacement, while the hooks engage and hold the fish from sliding off the spear. The firm retention of the fish is thereby insured, so that it may be withdrawn from the water without liability of loss. It will be observed that in spearing or gaffing a fish of any ordinary size, a fish will be pierced only by the spear 2, and engaged lightly by barbs 7, thus preventing any material degree of mutilation. When the fish is a heavy one, the barbs, of course, will sink into the body of the fish, but not to such an extent as to materially mutilate the fish or render it unfit for the table or market or to be cooked and served in any of the usual ways.

I claim:—

1. A fish gaff or spear comprising a handle, a spear projecting forwardly therefrom, spring hooks on opposite sides of the spear provided with terminal barbs, and guide arms leading from the barbs of the hooks.

2. A fish spear or gaff comprising a handle, a spear projecting forwardly therefrom, longitudinally curved hooks secured at one end of the handle and having inturned barbs at their opposite ends disposed in proximity to each other and to the point of the spear, and guide arms connected at one end with the barbs of the hooks, and projecting outwardly and forwardly therefrom in divergent relation.

3. A fish gaff or spear comprising a handle, a spear projecting forwardly therefrom, hooks secured at one end to the handle and having inturned barbs at their opposite ends disposed in proximity to each other and to the spear point, divergent guide arms projecting from said barbs, and means for clamping the shanks of the hooks to the handle.

In testimony whereof I affix my signature in presence of two witnesses.

JEREMIAH J. BOUDREAU.

Witnesses:
A. J. OLSON,
W. H. LEWIS.

Copies of this patent may be obtained for five cents each, by addressing the "Commissioner of Patents, Washington, D. C."